United States Patent
Wang

(10) Patent No.: US 8,423,060 B2
(45) Date of Patent: Apr. 16, 2013

(54) MOBILE PHONE AND METHOD FOR PROCESSING SHORT MESSAGE

(75) Inventor: Peng Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/191,461

(22) Filed: Jul. 27, 2011

(65) Prior Publication Data

US 2012/0322471 A1 Dec. 20, 2012

(30) Foreign Application Priority Data

Jun. 16, 2011 (CN) .......................... 2011 1 0161990

(51) Int. Cl.
*H04W 4/00* (2009.01)
(52) U.S. Cl.
USPC ...................................... 455/466; 455/412.2
(58) Field of Classification Search ............... 455/412.1, 455/412.2, 413, 414.1, 556.1, 556.2, 557, 455/466
See application file for complete search history.

(56) References Cited

U.S. PATENT DOCUMENTS

| | | | |
|---|---|---|---|
| 2006/0240868 A1* | 10/2006 | Kaplan et al. ................. | 455/558 |
| 2008/0268827 A1* | 10/2008 | Parthipan ....................... | 455/418 |
| 2009/0092233 A1* | 4/2009 | Meli et al. ................... | 379/88.11 |
| 2010/0076926 A1* | 3/2010 | Lecciso et al. ................ | 707/610 |
| 2010/0106781 A1* | 4/2010 | Gupta ........................... | 709/206 |
| 2010/0120453 A1* | 5/2010 | Tamchina et al. ............. | 455/466 |
| 2010/0138441 A1* | 6/2010 | Ryu ............................. | 707/769 |

* cited by examiner

*Primary Examiner* — Jinsong Hu
*Assistant Examiner* — Magdi Elhag
(74) *Attorney, Agent, or Firm* — Altis Law Group, Inc.

(57) ABSTRACT

The disclosure provides a mobile phone for processing short message and a short message processing method adapted for the mobile phone. The method includes steps: receiving a short message, the short message includes a sender and content, evaluating whether a sender of the received short message is a contact from the phone book. If a sender of the received short message is a name from the phone book or a name in the phone book is searched from the content of the short message when a sender of the received short message is not a name from the phone book. Evaluating whether the content of the short message includes contact information, if yes, evaluating whether the contact information has been recorded in a contact represented by the name in the phone book; and if no, recording the contact information as the contact.

12 Claims, 2 Drawing Sheets

MOBILE PHONE AND METHOD FOR PROCESSING SHORT MESSAGE

BACKGROUND

1. Technical Field

The disclosure relates to a mobile phone and, more particularly, to a mobile phone able to process a short message and a short message processing method adapted for the mobile phone.

2. Description of Related Art

Mobile phone users may change their phone numbers and send a short message to notify the receiving party. However, the receiving party must acquire the changed phone number from the short message and store the changed phone number in a phone book. This is inconvenient and can be complex, and if the short message is deleted before the receiving party stores the changed phone number in the mobile phone, it can be difficult to make future contact with the sender of the message.

Therefore, what is needed is a mobile phone to overcome the described shortcoming.

DETAILED DESCRIPTION

Figure 1:
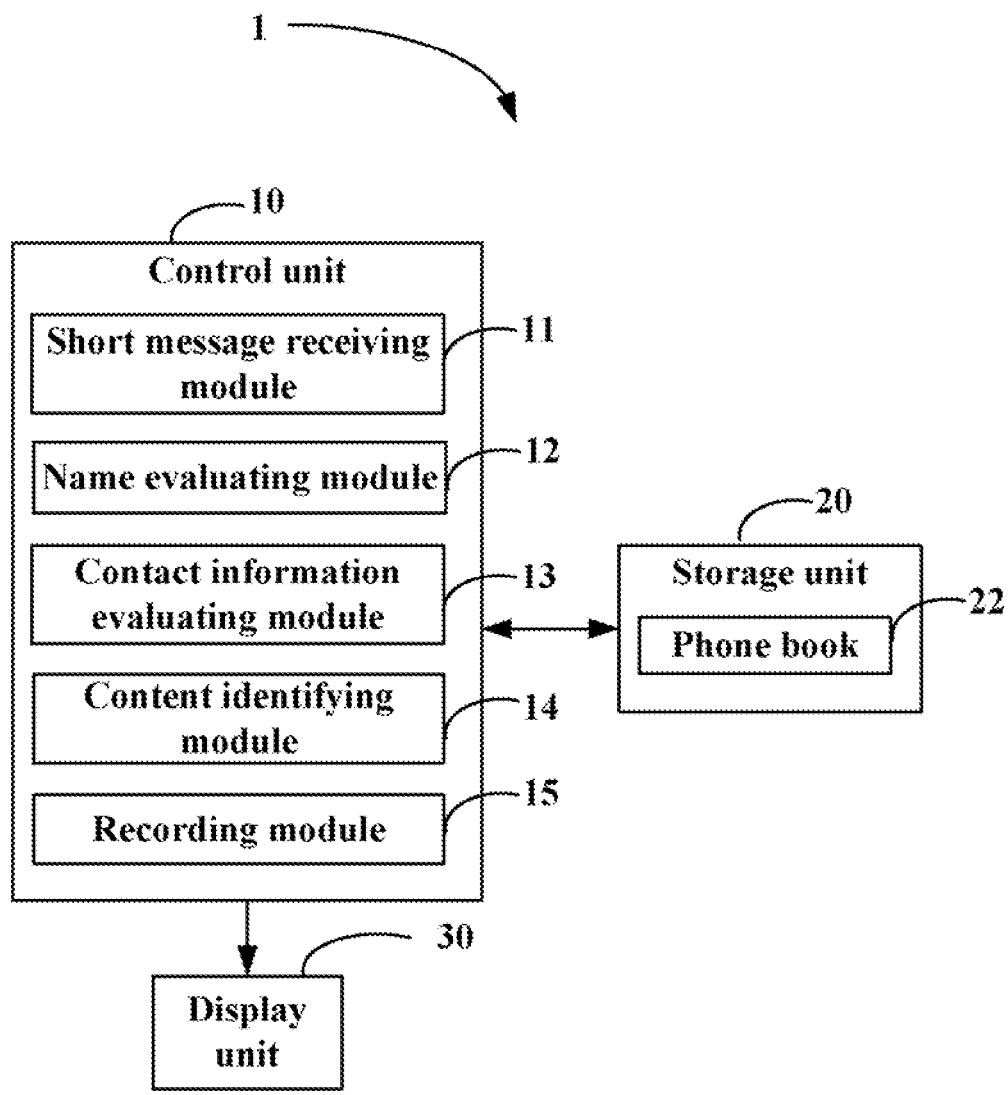
FIG. 1 is a block diagram of a mobile phone for processing short message, in accordance with an exemplary embodiment.

FIG. 1 is a block diagram of a mobile phone 1 for short message, in accordance with an exemplary embodiment. The mobile phone 1 communicates with a wireless communication system (not shown). The mobile phone 1 includes a control unit 10, a storage unit 20, and a display unit 30. The storage unit 20 stores a phone book 22 which stores a plurality of contacts, each of which is represented by a name and contact information. In the embodiment, the contact information includes one or more phone numbers and/or one or more email addresses. For example, a contact in the phone book 22 is represented as "Andy" and includes a name and a phone number "137XXXXXXXX". The display unit 30 displays information.

The control unit 10 further includes a short message receiving module 11, a name evaluating module 12, a contact information evaluating module 13, a content identifying module 14, and a recording module 15. The short message receiving module 11 receives a short message from the wireless communication system. Each short message includes a sender and a content which is independent from the sender. The sender may be represented as a name of a contact in the phone book 22 or a phone number.

The name evaluating module 12 evaluates whether a sender of the received short message is a name from the phone book 22. If the sender of the short message is not a name from the phone book 22, the name evaluating module 12 further evaluates whether a name in the phone book 22 is searched from the content of the short message. For example, the name evaluating module 12 compares the name of each contact in the phone book 22 with the content of the short message. In another embodiment, the mobile phone 1 respectively defines one ID in the front of the name and in the back of the name in the content of the short message. The name evaluating module 12 evaluates whether the content of the short message includes the two IDs, if the content of the short message includes the two IDs, a name is searched from the content of the short message.

If the sender is represented by a name, that means the sender (i.e., the name) exists in the phone book 22. If the sender is represented by a name or a name in the phone book 22 is searched from the content of the short message, the content identifying module 14 identifies whether the content of the received short message includes contact information. In the embodiment, the contact information includes one or more phone numbers and/or one or more email addresses, each phone number includes a predetermined number of successive numbers, such as 11 successive numbers, and each email address includes the symbol "@." When the content of the received short message includes the predetermined number of successive numbers and/or the symbol "@" in the middle of a series of letters, the content of the received short message content includes contact information.

If the content of the received short message includes the contact information, that means the sender may update his/her contact information, the contact information evaluating module 13 evaluates whether the contact information has been recorded in a contact represented by the name in the phone book 22. For example, when the short message receiving module 11 receives a short message, which includes the sender represented as "Andy" and the content including "My phone number is 130XXXXXXXX please contact me freely". That means the sender "Andy" exists in the phone book 22, the contact information evaluating module 13 evaluates whether the phone number "130XXXXXXXX" exists in the contact represented as "Andy".

If the contact information has not been recorded in the contact represented by the name in the phone book 22, the recording module 15 records the contact information in the contact represented by the name in the phone book 22, thereby the phone book 22 is updated. For example, a contact in the phone book 22 includes the name "Andy", the phone number "150XXXXXXXX", and the email address XXX@XXX.com. When the mobile phone 1 receives the short message to change a phone number from "Andy", the mobile phone 1 searches a phone number "137XXXXXXXX" from the received short message and records the phone number "137XXXXXXXX" in the contact represented by "Andy", as such, the contact is represented by the name "Andy", with the phone numbers "150XXXXXXXX" and "137XXXXXXXX", and the email address XXX@XXX.com. Therefore, when the mobile phone 1 calls a contact in the phone book 22, the display unit 30 displays the updated phone book 22.

The mobile phone 1 searches the name and the contact information from the received short message to record the contact information in the contact represented by the name in the phone book 22 after receiving a short message. Therefore, when the mobile phone user wants to contact the contact, the mobile phone 1 acquires the updated phone book.

Figure 2:
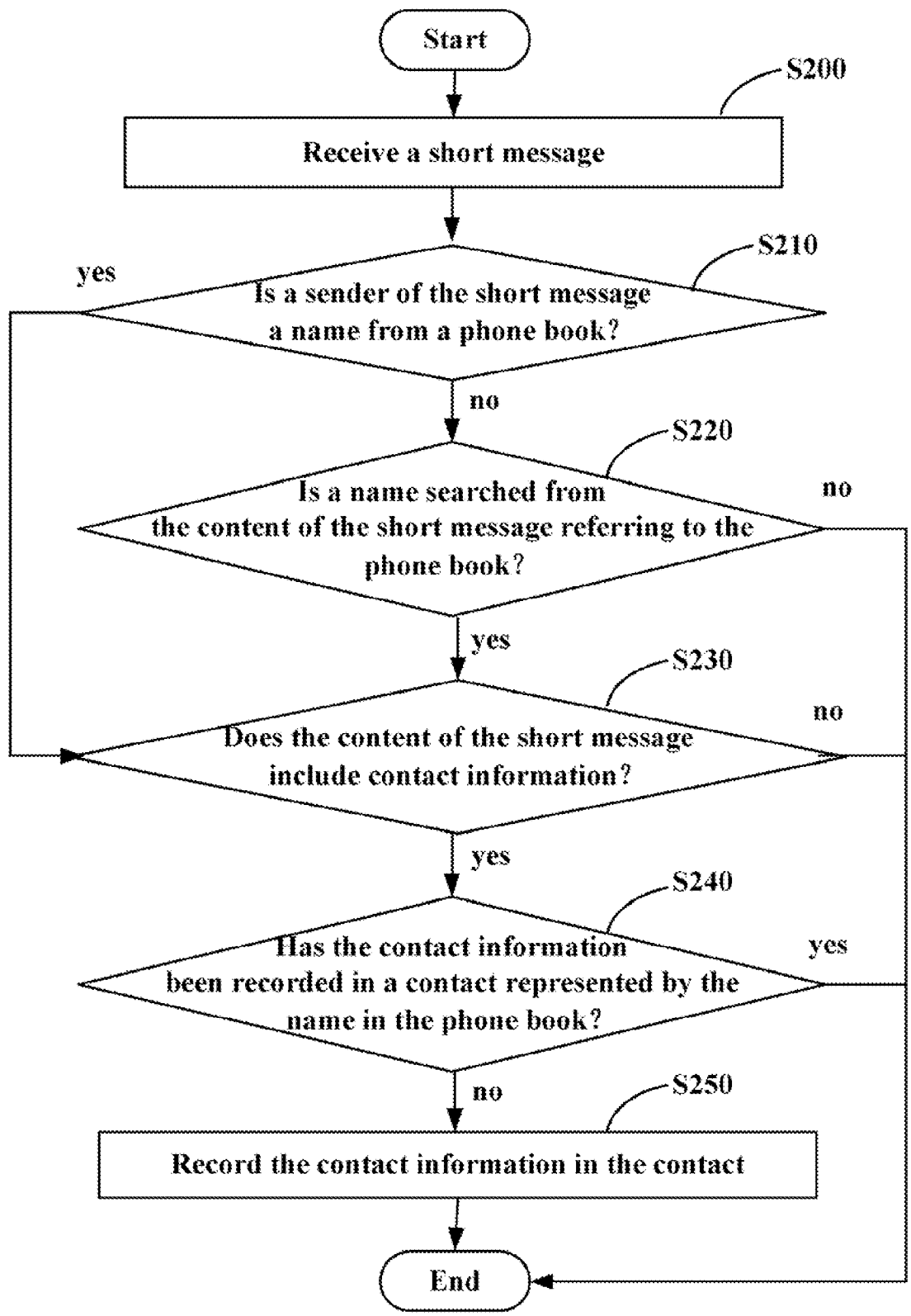
FIG. 2 is a flowchart of a short message processing method adapted for the mobile phone of FIG. 1, in accordance with an exemplary embodiment.

FIG. 2 is a flowchart of a short message processing method adapted for the mobile phone of FIG. 1, in accordance with an exemplary embodiment. In step S200, the short message receiving module 11 receives the short message from the wireless communication system. In step S210, the name evaluating module 12 evaluates whether a sender of the received short message is a name from the phone book 22. If the sender of the received short message is a name from the phone book 22, the procedure goes to S230. If the sender of the received short message is not a name from the phone book 22, in step S220, the name evaluating module 12 further evaluates whether a name in the phone book 22 is searched from the content of the short message. If a name is not searched from the content of the short message, the short message is not about changing the contact information and the procedure ends.

If a name in the phone book 22 is searched from the content of the short message, the procedure goes to S230. In step S230, the contact information evaluating module 13 evaluates whether the content of the short message includes the contact information. If the content of the short message does not include the contact information, the short message is not about changing the contact information and the procedure ends.

If the content of the short message includes the contact information, in step S240, the content identifying module 14 further evaluates whether the contact information has been recorded in the contact represented by the name in the phone book 22. If the contact information has been recorded in the contact represented by the name in the phone book 22, the short message is not about changing the contact information and the procedure ends. If the contact information has not been recorded in the contact represented by the name in the phone book 22, in step S250, the recording module 15 records the contact information in the contact, the procedure ends.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mobile phone for processing short message, comprising:
   a storage unit for storing a phone book which stores a plurality of contacts, each contact represented by a name and contact information; and
   a control unit comprising:
      a short message receiving module for receiving a short message, wherein the short message comprises a sender and a content which is independent from the sender;
      a name evaluating module for evaluating whether a sender of the received short message is a name from the phone book and whether a name in the phone book is searched from the content of the short message when a sender of the received short message is not a name from the phone book;
      a contact information evaluating module for evaluating whether the content of the short message includes the contact information when the sender of the received short message is a name from the phone book or when the sender of the received short message is not a name from the phone book and a name in the phone book is searched from the content of the short message;
      a content identifying module for evaluating whether the contact information has been recorded in the contact represented by the name in the phone book when the content of the short message includes the contact information; and
      a recording module for recording the contact information in the contact represented by the name in the phone book if the contact information has not been recorded in the contact represented by the name in the phone book.

2. The mobile phone as recited in claim 1, wherein the contact information comprises one or more phone numbers.

3. The mobile phone as recited in claim 1, wherein the contact information comprises one or more email addresses.

4. The mobile phone as recited in claim 1, wherein the contact information comprises one or more phone numbers and one or more email addresses.

5. The mobile phone as recited in claim 1, wherein the name evaluating module compares the name of each contact in the phone book with the content of the short message to search the name from the content.

6. The mobile phone as recited in claim 1, wherein two IDs are defined in the front of the name and in the back of the name in the content of the short message and the name evaluating module evaluates whether the content of the short message comprises the two IDs, when the content of the short message includes the two IDs, the name is searched from the content.

7. A short message processing method adapted for a mobile phone, the mobile phone storing a phone book which stores a plurality of contacts, each contact represented by a name and contact information, the method comprising:
   receiving a short message, wherein the short message comprises a sender and a content which is independent from the sender;
   evaluating whether a sender of the received short message is a name from the phone book;
   if a sender of the received short message is not a name from the phone book, evaluating whether a name in the phone book is searched from the content of the short message;
   if a sender of the received short message is a name from the phone book or if a sender of the received short message is not a name from the phone book and a name in the phone book is searched from the content of the short message, evaluating whether the content of the short message comprises contact information;
   if the content of the short message comprises contact information, evaluating whether the contact information has been recorded in a contact represented by the name in the phone book; and
   if the contact information has not been recorded in a contact represented by the name in the phone book, recording the contact information in the contact.

8. The short message processing method as recited in claim 7, wherein the contact information comprises one or more phone numbers.

9. The short message processing method as recited in claim 7, wherein the contact information comprises one or more email addresses.

10. The short message processing method as recited in claim 7, wherein the contact information comprises one or more phone numbers and one or more email addresses.

11. The short message processing method as recited in claim 7, the step of "evaluating whether the name in the phone book is searched from the content of the short message" is comparing the name of each contact in the phone book with the content of the short message.

12. The short message processing method as recited in claim 7, the step of "evaluating whether a name in the phone book is searched from the content of the short message" is defining two IDs in the front of the name and in the back of the name in the content of the short message and evaluates whether the content of the short message comprises the two IDs.

* * * * *